United States Patent
Min et al.

(10) Patent No.: US 6,710,936 B2
(45) Date of Patent: Mar. 23, 2004

(54) IMAGE SENSOR MODULE WITH ZOOMING FUNCTION

(75) Inventors: Sung Won Min, Seoul (KR); Chan Soo Kim, Suwon (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/330,601

(22) Filed: Dec. 26, 2002

(65) Prior Publication Data

US 2003/0214727 A1 Nov. 20, 2003

(30) Foreign Application Priority Data

May 17, 2002 (KR) .......................... 2002-27537

(51) Int. Cl.⁷ .......................... G02B 15/14; G02B 7/02; G03B 17/00
(52) U.S. Cl. .................. 359/696; 359/694; 359/699; 359/700; 359/701; 359/826; 396/72; 396/79; 396/83
(58) Field of Search .................. 359/694, 697, 359/698, 699, 700, 701, 823, 826; 396/72, 79, 83

(56) References Cited

U.S. PATENT DOCUMENTS

| | | | |
|---|---|---|---|
| 5,016,993 A | * 5/1991 | Akitake | 359/696 |
| RE34,059 E | * 9/1992 | Akitake | 359/700 |
| 5,196,963 A | * 3/1993 | Sato et al. | 359/699 |
| 5,267,085 A | * 11/1993 | Sasaki et al. | 359/694 |
| 5,270,868 A | * 12/1993 | Nomura | 359/700 |
| 5,815,325 A | * 9/1998 | Johnson | 359/696 |
| 6,389,231 B1 | * 5/2002 | Onda | 396/83 |
| 6,516,148 B1 | * 2/2003 | Kim et al. | 396/72 |
| 6,570,717 B1 | * 5/2003 | Tu et al. | 359/696 |
| 6,618,212 B2 | * 9/2003 | Chikami et al. | 359/700 |

* cited by examiner

*Primary Examiner*—Loha Ben
(74) *Attorney, Agent, or Firm*—Darby & Darby

(57) ABSTRACT

An image sensor module with a zooming function is disclosed. The sensor module consists of first and second barrels for respectively holding condensing lenses used for image capture, and a housing having a guide channel at a sidewall thereof and movably and stably receiving the first extensions of the first and second barrels in the guide channel such that the first and second barrels are moved along a focusing axis of the condensing lenses. The sensor module also has a motor for generating a rotating force, a motor gear formed on the output shaft of the motor, and a means for controlling the interval between the first and second barrels by converting a rotating action of the motor gear into a linear movement of the first and second barrels in a horizontal direction. In the sensor module used in a variety of electronic apparatuses, the condensing lenses are movable to change their positions, thus accomplishing a zooming effect while precisely condensing light beams to produce clear images.

3 Claims, 5 Drawing Sheets

IMAGE SENSOR MODULE WITH ZOOMING FUNCTION

BACKGROUND OF THE INVENTION

1. Field of the Invention

The present invention relates, in general, to image sensor modules used in a variety of electronic apparatuses and, more particularly, to a thin sensor module with a zooming function, in which the condensing lenses are movable to change their positions, thus accomplishing a zooming effect while precisely condensing light beams to produce clear images.

2. Description of the Prior Art

As well known to those skilled in the art, image sensor modules are installed in a variety of electronic apparatuses, such as video cameras, digital still cameras, PC cameras, mobile phones, PDAS, etc., for image capture. In recent years, in accordance with a variety of requirements of mobile phone consumers, manufacturers of mobile phones have actively studied enhancement of the functions of their mobile phones.

In an effort to enhance the functions of such mobile phones, digital cameras fabricated using image sensor modules have been added to mobile phones. Such a mobile phone with a digital camera transmits an image to the phone of a phoning companion, and displays an image, transmitted from the companion's phone, on its LCD, thus allowing users to conveniently transmit and receive images through their mobile phones.

The conventional mobile phones which can be used with such digital cameras are classified into several types, that is, bar-type phones with a variety of numerical and function buttons provided on the phone body to be directly exposed to the outside, flip-type phones with a hinged cover covering the buttons, and folding-type phones with a folding main body. In accordance with the recent trend toward smallness and compactness of mobile phones, the folding-type phones have become more widely used than the other type phones.

FIG. 1 shows the construction of a folding-type mobile phone with a conventional detachable digital camera. As shown in the drawing, the detachable digital camera 2 can be attached to the ear jack terminal 1d formed at the main body 1a of the mobile phone 1 using a dummy plug 3. In order to attach the detachable digital camera 2 to the body 1a of the mobile phone 1 using the dummy plug 3, the digital camera 2 has an ear jack terminal 2b in the same manner as the ear jack terminal 1d formed at a sidewall of the phone's body 1a. The dummy plug 3 has two plug terminals 3a and 3b at both ends of a central plug body 3c, and electrically couples the camera 2 to the phone 1 by the first and second plug terminals 3a and 3b respectively inserted into the two ear jack terminals 2b and 1d. In brief, temporary attachment of the digital camera 2 to the mobile phone 1 is accomplished by insertion of the two plug terminals 3a and 3b of the dummy plug 3 into the two ear jack terminals 2b and 1d.

When the digital camera 2 is attached to the mobile phone 1 by means of the dummy plug 3 as described above, the camera 2 is rotatable around the axis of the plug 3, thus allowing a user to control the photographing direction of the camera 2 in accordance with the position and focused angle of an objective, such as a person or a scene, to be photographed. That is, when photographing an objective, such as a person or a scene, using the digital camera 2, the user controls the direction of the camera 2 while viewing the position and focused angle of the objective, displayed on the LCD 1c provided at the fold 1b of the phone 1.

FIG. 2 shows the internal construction of a conventional image sensor module installed in such a detachable digital camera 2, for image capture. As shown in the drawing, the sensor module comprises a housing 10 defining a cavity 11 therein.

A holder 20 is mounted to the first end of the housing 10, with a condensing lens 21 set in the holder 20 for precisely condensing an image.

An iris filter 30, used to regulate the amount of light, is set in the cavity 11 of the housing 10 while being fixed to the housing 10 by means of an epoxy resin 40. A ceramic circuit board 50 is fixedly mounted to the second end of the housing 10 by means of an epoxy resin 40.

Mounted on the top surface of the circuit board 50 at a position inside the housing 10 is an image sensor 51.

The image sensor 51 is mounted to the top surface of the circuit board 50 through a die-bonding process, and is electrically connected to a circuit of the board 50 through a wire-bonding process.

In the above description, the image sensor module is described as it is used in a digital camera for mobile phones. However, it should be understood that such sensor modules may be preferably used in a variety of cameras, including such digital cameras for mobile phones, to accomplish the recent trend toward thinness, compactness and lightness of the cameras.

When the digital cameras using the sensor modules of FIG. 2 are used with portable electronic apparatuses, such as mobile phones, the digital cameras are somewhat inconvenient to users while photographing an objective, as follows: that is, when it is desired to enlarge or reduce the size of a photographed image, a user manually and carefully moves the apparatus with the camera toward or away from the objective while viewing the focused images displayed on the LCD, so the camera is inconvenient to the user.

The above problem is caused by a structural default of the conventional sensor module in that the position of the condensing lens for condensing light beams to produce images is fixed in the barrel of the sensor module, so the sensor module cannot accomplish a zooming function.

SUMMARY OF THE INVENTION

Accordingly, the present invention has been made keeping in mind the above problems occurring in the prior art, and an object of the present invention is to provide an image sensor module with a zooming function, which is used in a variety of electronic apparatuses, and in which the condensing lenses are movable to change their positions, thus accomplishing a zooming effect while precisely condensing light beams to produce clear images.

In order to accomplish the above objects, the present invention provides an image sensor module with a zooming function, comprising: first and second barrels for respectively holding condensing lenses used for image capture; a housing having a guide channel at a sidewall thereof and movably and stably receiving the first extensions of the first and second barrels in the guide channel such that the first and second barrels are moved along a focusing axis of the condensing lenses and are stably held at selected positions; a motor for generating a rotating force; a motor gear formed on the output shaft of the motor; and a means for controlling the interval between the first and second barrels by converting a rotating action of the motor gear into a linear movement of the first and second barrels in a horizontal direction.

In an embodiment, the interval control means comprises: a rotary cam disc rotatably provided outside the housing, with two arc-shaped guide slots formed on the cam disc at opposite positions spaced apart from each other at an angular interval, the cam disc receiving the second extensions of the first and second barrels in the guide slots, respectively; and a rotary cam gear formed on the rotary cam disc, and engaging with the motor gear such that the rotary cam gear is rotated by the rotating force of the motor gear in a direction opposite to the rotating direction of the motor gear.

In another embodiment, the interval control means comprises: two cam gears positioned to be opposite each other and jointed to the second extensions of the first and second barrels, respectively, and also engaging with the motor gear such that the cam gears convert the rotating action of the motor gear into the linear movement of the first and second barrels in the horizontal direction.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
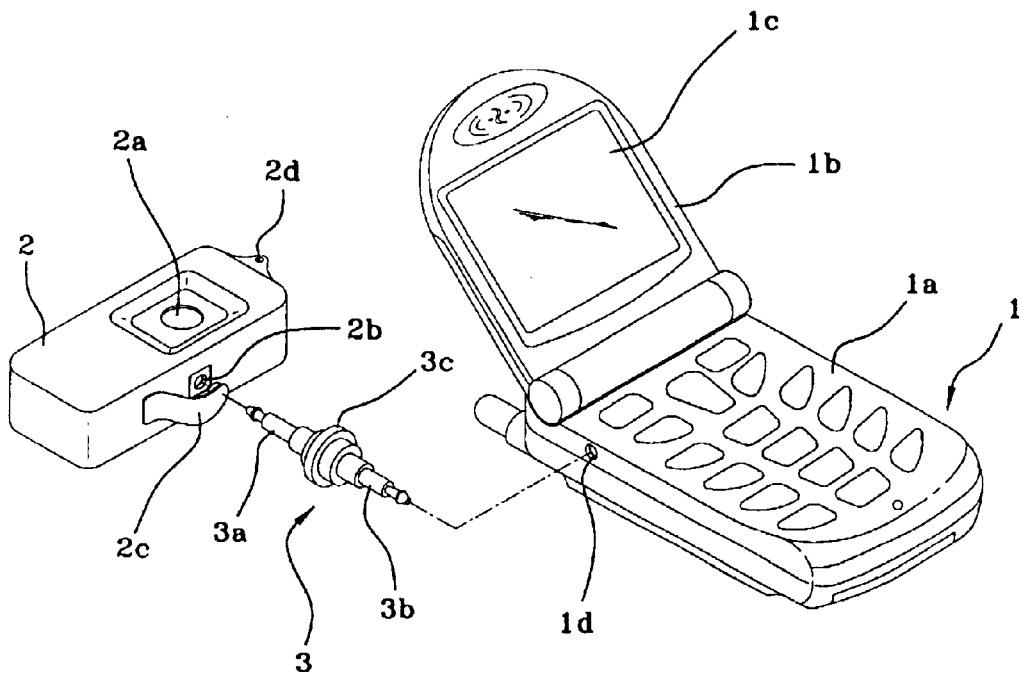
FIG. 1 is a perspective view of a folding-type mobile phone provided with a conventional detachable digital camera.
Figure 2:
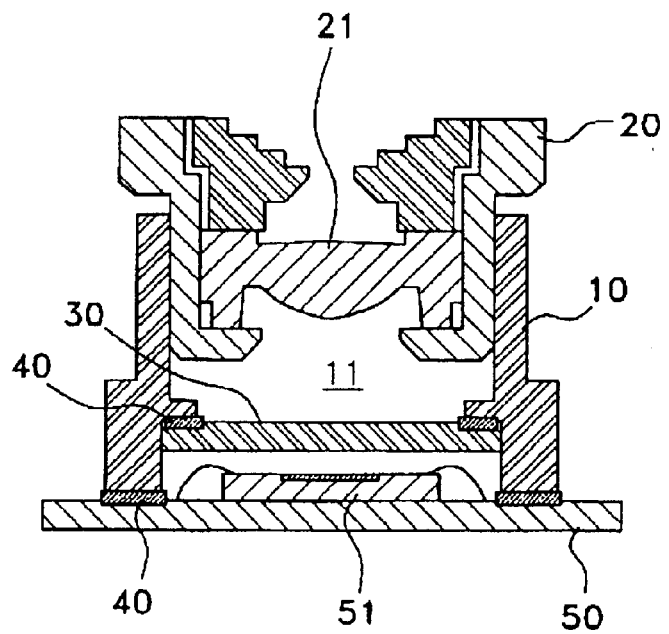
FIG. 2 is a sectional view showing the internal construction of a conventional image sensor module installed in the detachable digital camera, for image capture.

Reference should now be made to the drawings, in which the same reference numerals are used throughout the different drawings to designate the same or similar components.

Figure 3:
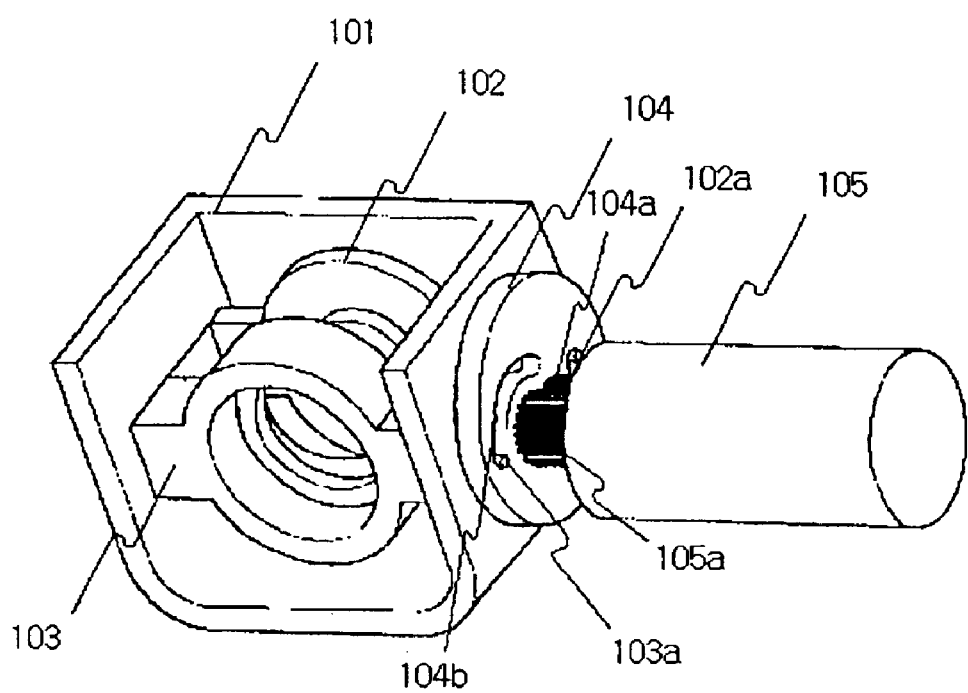
FIG. 3 is a perspective view of an image sensor module with a zooming function in accordance with the primary embodiment of the present invention.
Figure 4:
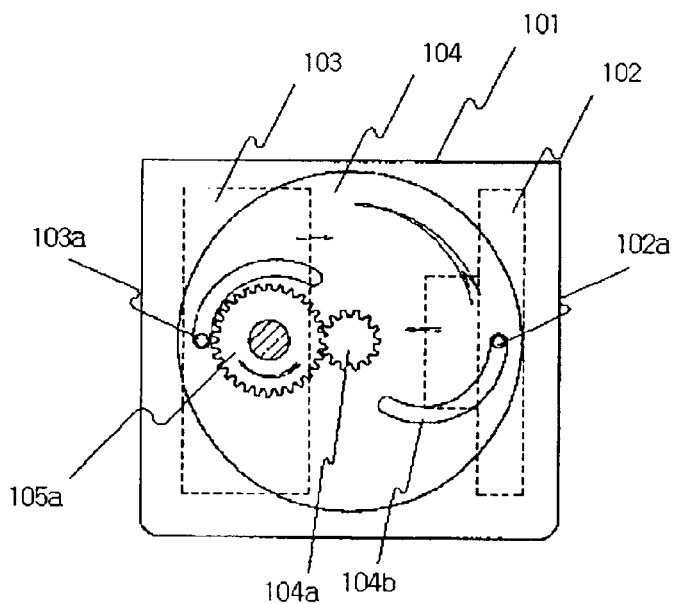
FIGS. 4 and 5 are schematic views, showing operation of the sensor module of FIG. 3.
Figure 5:
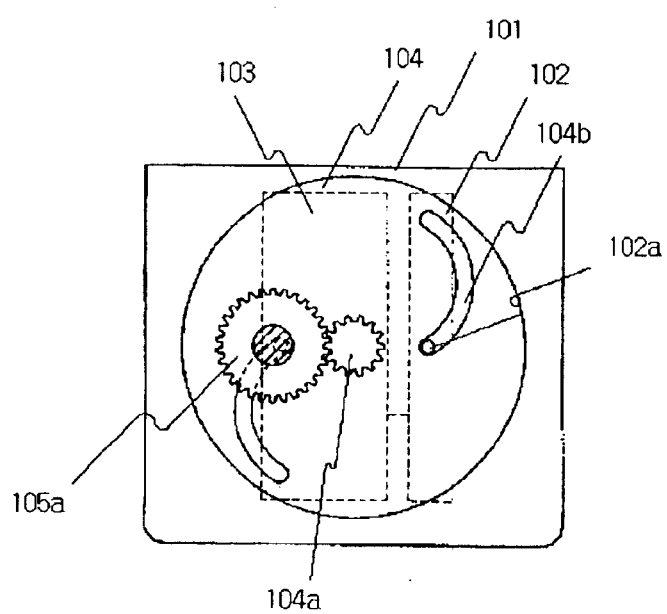
Figure 6:
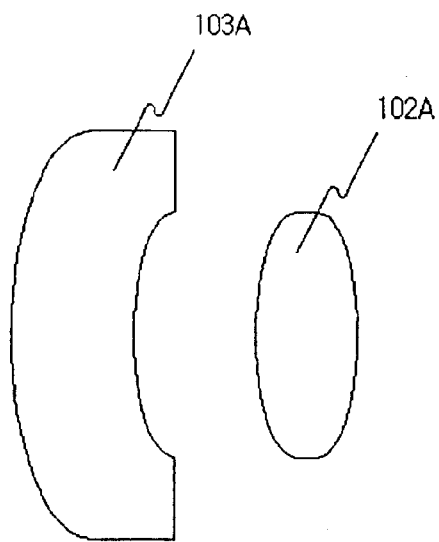
FIG. 6 is a schematic view, showing a lens system used in the image sensor module of the present invention.

FIG. 3 is a perspective view of an image sensor module with a zooming function in accordance with the primary embodiment of the present invention. FIGS. 4 and 5 are schematic views, showing operation of the sensor module of FIG. 3. FIG. 6 is a schematic view, showing a lens system used in the sensor module of this invention.

The construction and operation of the image sensor module with a zooming function in accordance with the primary embodiment of this invention will be described herein below with reference to FIGS. 3 to 6.

As shown in the drawings, the image sensor module with a zooming function according the primary embodiment of this invention comprises a main body 101, a rotary cam disc 104, a motor 105, a motor gear 105a, and a rotary cam gear 104a. The housing of the main body 101 movably and stably holds two lens-holding barrels 102 and 103 therein. Each of the two barrels 102 and 103 has horizontal extensions at opposite sides, while the opposite sidewalls of the body's housing are interiorly provided with horizontal guide channels, respectively. In order to accomplish the movable arrangement of the two barrels 102 and 103, the extensions of the two barrels 102 and 103 are movably and sequentially set in the guide channels formed at the sidewalls of the body's housing, such that the barrels 102 and 103 are linearly moved along the focusing axis of lenses under the guide of said guide channels. The rotary cam disc 104 is rotatably positioned outside the right-hand sidewall of the body's housing in FIG. 3, with two arc-shaped guide slots 104b formed on the cam disc 104 at diametrically opposite positions which are spaced apart from each other at an angular interval of 180°. The second extensions of the two barrels 102 and 103 have guide projections 102a and 103a at their ends, and the guide projections 102a and 103a are received in the two guide slots 104b of the cam disc 104, respectively. The motor 105 is provided at the outside of the main body 101, and generates a rotating force for the rotary cam disc 104. The motor gear 105a is formed on the output shaft of the motor 105, while the rotary cam gear 104a is formed at the center of the rotary cam disc 104. This rotary cam gear 104a engages with the motor gear 105a, so the cam gear 104a is rotated by the rotating force of the motor gear 105a in a direction opposite to the rotating direction of the motor 105. In sensor module of the primary embodiment, the rotary cam disc 104 and the rotary cam gear 104a constitute a means for controlling the interval between the two barrels 102 and 103.

When the motor 105 is operated to rotate the motor gear 105a clockwise, at a position in which the two barrels 102 and 103 are spaced apart from each other at the maximum interval as shown in FIG. 4, the rotary cam gear 104a engaging with the motor gear 105a is rotated counterclockwise.

Since the rotary cam gear 104a is fixed to the center of the rotary cam disc 104, the cam disc 104 is rotated in the same direction as that of the cam gear 104a. That is, the cam disc 104 is rotated counterclockwise. During such a counterclockwise rotation of the rotary cam disc 104, the guide projections 102a and 103a formed at the second extensions of the two barrels 102 and 103 movably inserted in the two arc-shaped guide slots 104b of the cam disc 104 slide along the guide slots 104b.

Therefore, the two barrels 102 and 103 are moved toward each other to reduce the interval between them as shown in FIG. 5. Due to such a movement of the two barrels 102 and 103 toward each other as described above, the interval between two lenses (not shown) set in the two barrels 102 and 103 are also reduced. It is thus possible to accomplish the minimum interval between the two lenses of the sensor module.

On the other hand, when the motor 105 is operated to rotate the motor gear 105a counterclockwise, at a position in which the two barrels 102 and 103 are spaced apart from each other at the minimum interval as shown in FIG. 5, the rotary cam gear 104a engaging with the motor gear 105a is rotated clockwise.

Since the rotary cam gear 104a is fixed to the center of the rotary cam disc 104, the clockwise rotation of the cam gear 104a results in a clockwise rotation of the cam disc 104. During such a clockwise rotation of the rotary cam disc 104, the two guide projections 102a and 103a of the two barrels 102 and 103, movably inserted in the two arc-shaped guide slots 104b of the cam disc 104, slide along the guide slots 104b.

Therefore, the two barrels 102 and 103 are moved away from each other to enlarge the interval between them as shown in FIG. 4. Due to such a movement of the two barrels 102 and 103 away from each other as described above, the interval between the lenses of the two barrels 102 and 103 are also enlarged.

When assuming that the two lenses set in the two barrels 102 and 103 form a lens system of FIG. 6, in which the first lens 102A is set in the first barrel 102 and the second lens 103A is set in the second barrel 103, the sensor module does not perform a zooming function when the two barrels 102 and 103 are positioned in the maximum interval state in which the two lenses 102A and 103A are spaced apart from each other at the maximum interval as shown in FIG. 4. However, the sensor module performs a desired zooming function when the two barrels 102 and 103 are moved toward each other to reduce the interval between the two lenses 102A and 103B.

Therefore, it is noted that the maximum zooming effect is accomplished by the barrels 102 and 103 positioned in the minimum interval state as shown in FIG. 5.

The lens system used in the sensor module of this invention is not limited to the system of FIG. 6, but the lens system may be accomplished by inverting the arrangement of the lenses in the lens system of FIG. 6. When inverting the arrangement of the lenses in the lens system of FIG. 6, the operation of the lens system is also inverted.

Figure 7:
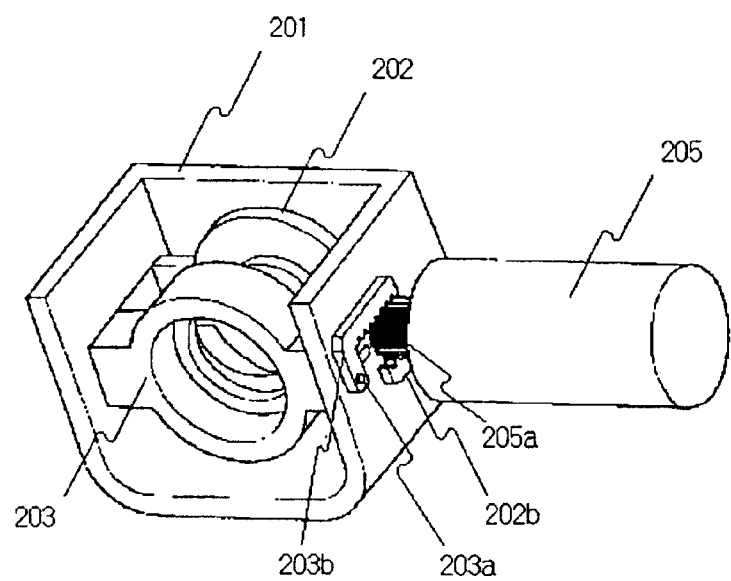
FIG. 7 is a perspective view of an image sensor module with a zooming function in accordance with the second embodiment of the present invention.
Figure 8:
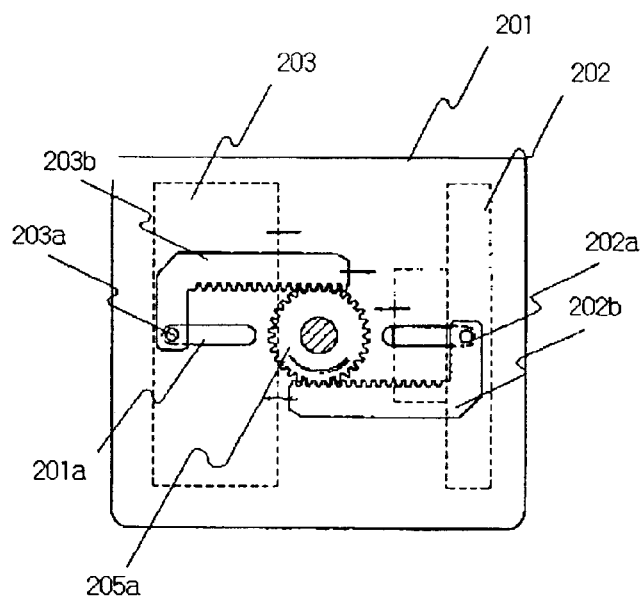
FIGS. 8 and 9 are schematic views, showing operation of the sensor module of FIG. 7.
Figure 9:
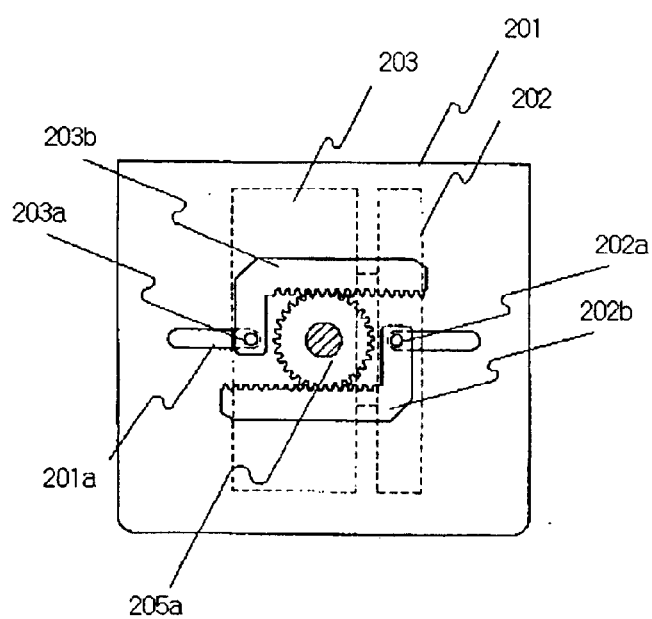

The construction of the image sensor module of this invention may be altered as shown in FIGS. 7 to 9 showing the second embodiment of the present invention. As shown in the drawings, the sensor module with a zooming function according the second embodiment of this invention comprises a main body 201, a motor 205, a motor gear 205a, and two linear cam gears 202b and 203b. The housing of the main body 201 movably and stably holds two lens-holding barrels 202 and 203 therein. Each of the two barrels 202 and 203 has horizontal extensions at opposite sides, while the opposite sidewalls of the body's housing are interiorly provided with guide channels, respectively, in the same manner as that described for the primary embodiment. In order to accomplish the movable arrangement of the two barrels 202 and 203 in the housing of the body 201, the extensions of the two barrels 202 and 203 are movably and sequentially set in the guide channels formed at the sidewalls of the body's housing, such that the barrels 202 and 203 are linearly moved along a focusing axis under the guide of said guide channels. The motor 205 is provided at the outside of the main body 201, and generates a rotating force for linearly moving the two barrels 202 and 203. The motor gear 205a is formed on the output shaft of the motor 205. The two linear cam gears 202b and 203b, each having a shape of a rack, are movably positioned outside the right-hand sidewall of the body's housing in FIG. 7, such that the cam gears 202b and 203b are positioned to be opposite each other and engage with the motor gear 205a at diametrically opposite positions of the gear 205a. Therefore, the two linear cam gears 202b and 203b convert the rotating action of the motor gear 205a into a rectilinear reciprocating action in a horizontal direction. The guide projections 202a and 203a formed at the second extensions of the two barrels 202 and 203 are jointed to the ends of the two cam gears 202b and 203b, respectively. In the sensor module according to the second embodiment, the two linear cam gears 202b and 203b constitute the means for controlling the interval between the two barrels 202 and 203.

When the motor 205 is operated to rotate the motor gear 205a clockwise, at a position in which the two barrels 202 and 203 are spaced apart from each other at the maximum interval as shown in FIG. 8, the two linear cam gears 202b and 203b engaging with the motor gear 205a are linearly moved inward in the horizontal direction to approach each other. Due to such an inward linear movement of the two cam gears 202b and 203b, the guide projections 202a and 203a of the two barrels 202 and 203, jointed to the ends of the two cam gears 202b and 203b, are linearly moved inward in the horizontal direction under the guide of two guide slots 201a formed at the right-hand sidewall of the body 201.

Therefore, the two barrels 202 and 203 are moved toward each other to reduce the interval between them as shown in FIG. 9. Due to such a movement of the two barrels 202 and 203 toward each other as described above, the interval between two lenses (not shown) set in the two barrels 202 and 203 are also reduced. It is thus possible to accomplish the minimum interval between the two lenses of the sensor module.

On the other hand, when the motor 205 is operated to rotate the motor gear 205a counterclockwise, at a position in which the two barrels 202 and 203 are spaced apart from each other at the minimum interval as shown in FIG. 9, the two linear cam gears 202b and 203b engaging with the motor gear 205a are linearly moved outward away from each other. Due to such an outward linear movement of the two cam gears 202b and 203b, the guide projections 202a and 203a of the two barrels 202 and 203, jointed to the ends of the two cam gears 202b and 203b, are linearly moved outward in the horizontal direction under the guide of the two guide slots 201a formed at the right-hand sidewall of the body 201.

When the two barrels 202 and 203 are moved away from each other to enlarge the interval between them as shown in FIG. 8, the interval between the lenses (not shown) of the two barrels, 202 and 203 are also enlarged.

As described above, the present invention provides an image sensor module with a zooming function, which is used in a variety of electronic apparatuses, and in which the condensing lenses are movable to change their positions, thus accomplishing a zooming effect while precisely condensing light beams to produce clear images. When the image sensor module of this invention is used in a thin digital camera for electronic apparatuses, the camera accomplishes a zoom-in and zoom-out effect without forcing a user to manually move the camera, so the camera having the sensor module of this invention is very convenient to users.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An image sensor module with a zooming function, comprising:

first and second barrels for respectively holding condensing lenses used for image capture;

a housing having a guide channel at a sidewall thereof and movably and stably receiving first extensions of said first and second barrels in the guide channel such that the first and second barrels are moved along a focusing axis of the condensing lenses and are stably held at selected positions;

a motor for generating a rotating force;

a motor gear formed on an output shaft of said motor; and means for controlling an interval between said first and second barrels by converting a rotating action of the motor gear into a linear movement of the first and second barrels in a horizontal direction.

2. The image sensor module according to claim 1, wherein said interval control means comprises:

a rotary cam disc rotatably provided outside said housing, with a plurality of arc-shaped guide slots formed on said cam disc at opposite positions spaced apart from each other at an angular interval, said cam disc receiving second extensions of said first and second barrels in said guide slots, respectively; and a rotary cam gear formed on said rotary cam disc, and engaging with said motor gear such that said rotary cam gear is rotated by the rotating force of the motor gear in a direction opposite to a rotating direction of said motor gear.

3. The image sensor module according to claim 1, wherein said interval control means comprises:

two cam gears positioned to be opposite each other and jointed to second extensions of the first and second barrels, respectively, said two cam gears also engaging with said motor gear such that the cam gears convert the rotating action of the motor gear into the linear movement of the first and second barrels in the horizontal direction.

* * * * *